March 11, 1930.  E. L. ACKERMAN ET AL  1,750,209

DEMOUNTABLE RIM

Filed Jan. 18, 1928   2 Sheets-Sheet 1

INVENTOR.
EDWARD L. ACKERMAN
ALOIS J. ZWIERZINA

BY

ATTORNEY.

March 11, 1930. E. L. ACKERMAN ET AL 1,750,209
DEMOUNTABLE RIM
Filed Jan. 18, 1928 2 Sheets-Sheet 2

INVENTORS
EDWARD L. ACKERMAN
ALOIS J. ZWIERZINA
BY
ATTORNEY.

Patented Mar. 11, 1930

1,750,209

UNITED STATES PATENT OFFICE

EDWARD L. ACKERMAN AND ALOIS J. ZWIERZINA, OF DETROIT, MICHIGAN

DEMOUNTABLE RIM

Application filed January 18, 1928. Serial No. 247,593.

This invention relates to demountable rims and the object of the invention is to provide a demountable rim which may be secured to a wheel by rotation of a rotatable member and in which the rotatable member may be locked to prevent removal of the rim and tire thereon.

Another object of the invention is to provide an arrangement for applying pressure to the rim to hold it on the wheel, the pressure applying means being adapted to be locked in position to maintain the pressure and prevent removal of the rim and tire.

Another object of the invention is to provide a device of the character described in which the parts for applying pressure to the rim to hold it on the wheel in the locking arrangement are enclosed in the felloe of the wheel.

A further object of the invention is to provide a demountable rim and wheel which is adapted to be locked or unlocked by a single member extending inwardly toward the wheel hub from the wheel felloe thus eliminating the studs and nuts by which a rim is usually secured to the wheel.

These objects and the several novel features of the invention are hereinafter more fully described and claimed and the preferred form of construction by which these objects are attained is shown in the accompanying drawings in which—

Figure 1:
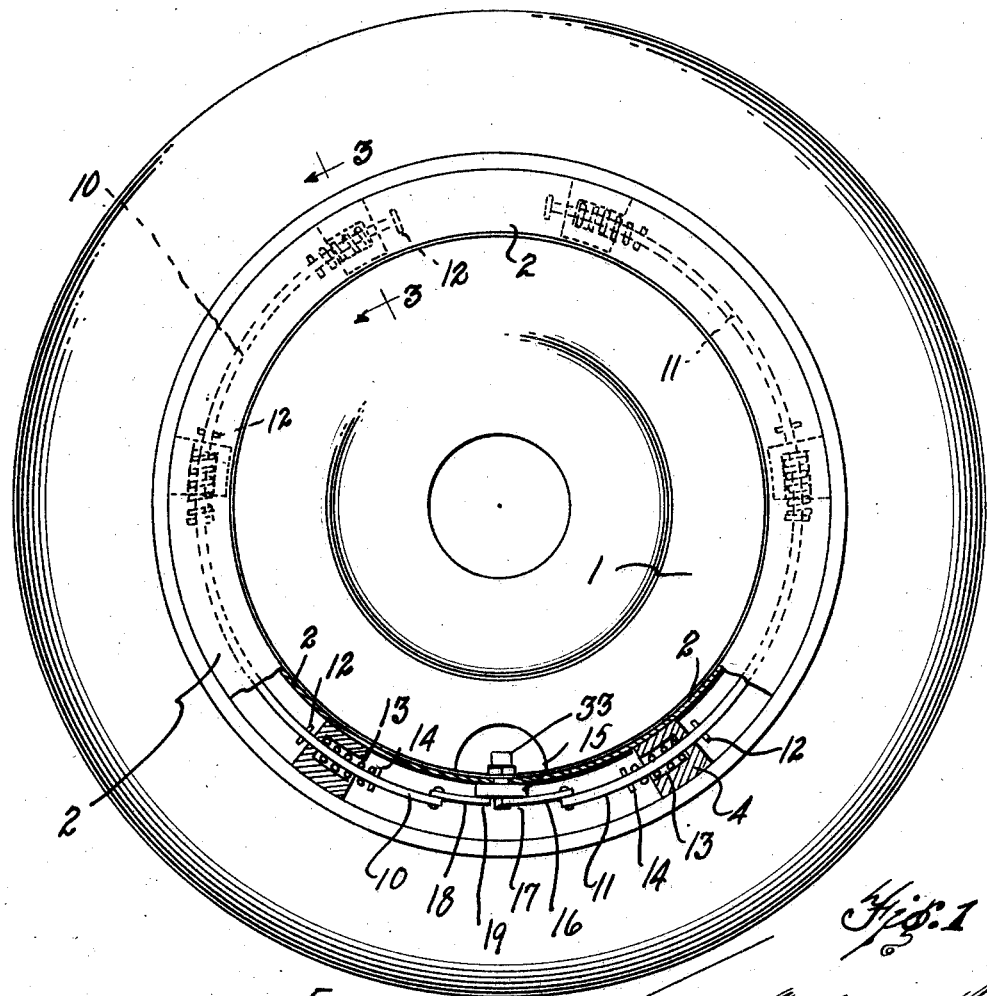
Fig. 1 is a side elevation of a wheel embodying our invention and having the rim and tire secured thereon.
Figure 2:
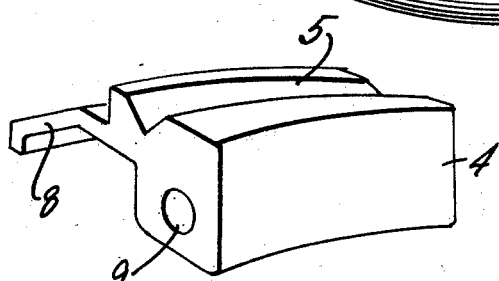
Fig. 2 is an enlarged perspective view of one of the locking lugs contained in the wheel felloe.
Figure 3:
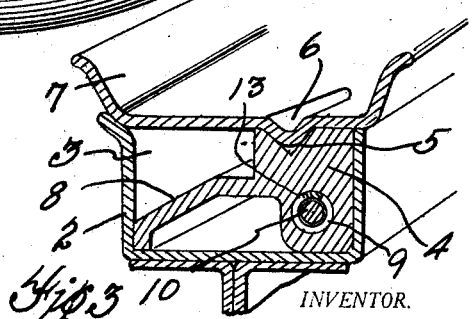
Fig. 3 is an enlarged section partly in perspective taken on line 3—3 of Fig. 1.
Figure 4:
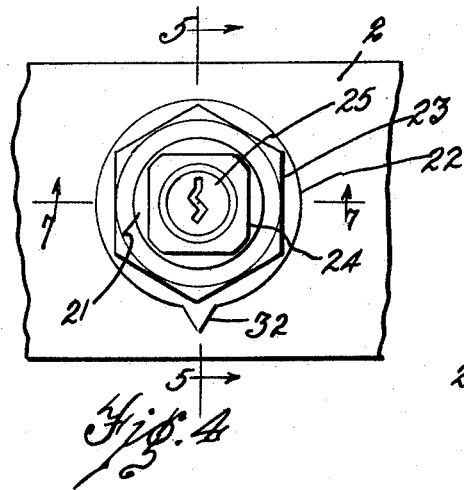
Fig. 4 is an enlarged plan view of the lock and rim secured member.

The wheel consists of a steel disc 1 shown in Fig. 1 which is provided with flanges at its outer edge by which it is secured to the wheel felloe 2 as shown in Fig. 3. The wheel felloe is also made of steel and provides an annular channel 3 therewithin in which the lugs 4 are slidably mounted. Each lug is provided with an angular V shaped groove 5 adapted to engage the angular depression 6 in the rim 7. As shown in Fig. 1 six lugs are provided and the rim is provided with six angular depressions 6 which are adapted to be engaged by the lugs 4. Each lug is provided with a guide flange 8 riding in the felloe to support the lug in the felloe for movement circumferentially of the wheel, As shown in Fig. 2 each member 4 is provided with an aperture 9 therethrough and as shown in Fig. 1 an arcuate rod 10 extends through three of the lugs on one side of the wheel while an arcuate rod 11 extends through the three lugs on the other side of the wheel. Each rod is provided with a pin 12 behind each lug 4 so that when the rods are drawn toward the locking device the lugs are drawn out of engagement with the respective projections in the rim. A spring 13 is provided in each lug engaging against a pin 14 in the rod and when these rods are moved away from the locking member the pins 14 increase the tension on the springs 13 and force the lugs into locking engagement with the projections in the rim. The device for moving the rods is shown more particularly in Fig. 8 and comprises a rotatable member 15 having a link 16 pivotally connected at 17 to one side thereof and a link 18 pivotally connected at 19 to the opposite side thereof. As shown in Fig. 1 the link 18 is pivotally connected to the rod 10 and the link 19 is pivotally connected to the rod 11. When the lock bolt 20 is extended between the ends of the links it is impossible to rotate the member 15 in a counterclock-wise direction as the ends of the links will engage the bolt 20 but when the bolt 20 is retracted the member 15 may be turned in a counter clockwise direction to draw the links 16 and 18 and rods 10 and 11 downwardly to retract the locking lugs 4 from engagement with the respective projections provided by the depressions 6 in the rim 7. Upon subsequent turning of the member 15 in a clockwise direction the links and rods are forced outwardly to force the lugs 4 into locking engagement with the projections in the rim.

Figure 5:
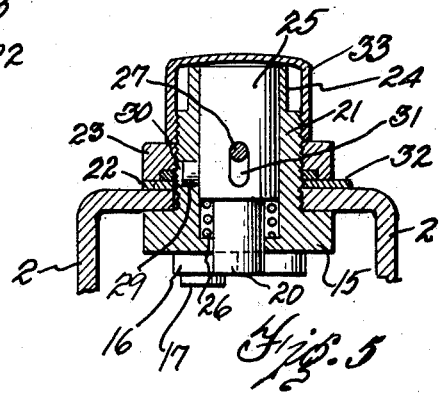
Fig. 5 is a section taken on line 5—5 of Fig. 4 and showing the dust cap positioned over the lock.
Figure 7:
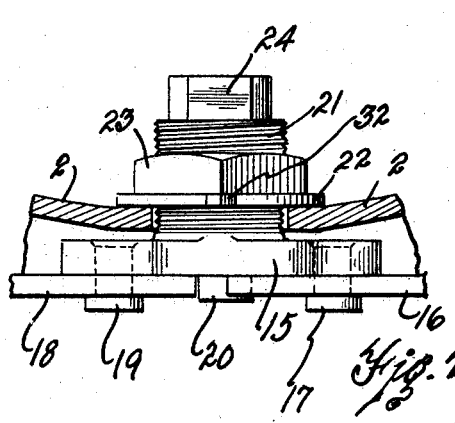
Fig. 7 is a section taken on line 7—7 of Fig. 4.
Figure 6:
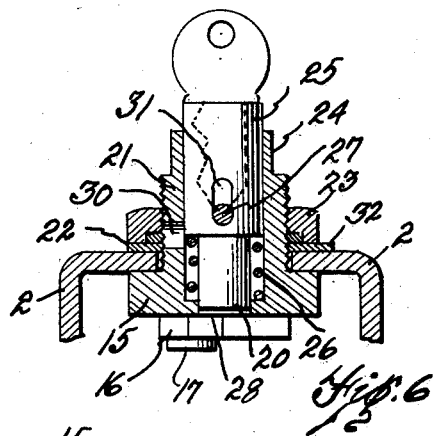
Fig. 6 is a section similar to Fig. 5 showing the lock in the unlocked position.
Figure 8:
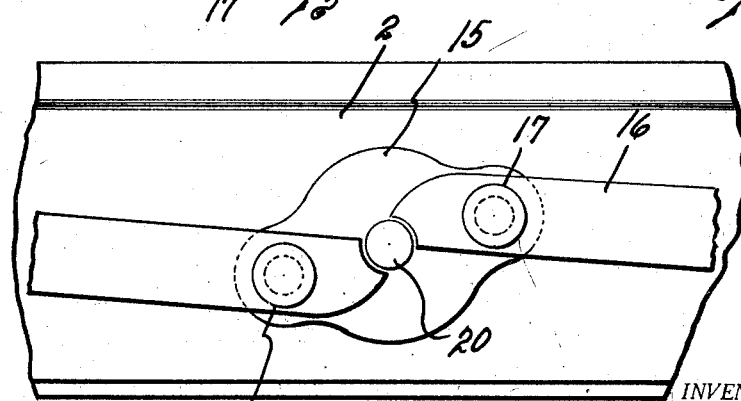
Fig. 8 is a view of the under side of Fig. 7.

The particular object of this invention is to provide an arrangement for locking the rods in the extended position to lock the rim on the wheel. For this purpose the member 15 is provided with an extension 21 extending through an aperture in the wheel felloe 2 and a washer 22 is positioned over this extension and a nut 23 is threaded downwardly thereon. In this manner the member 15 is rotatably mounted in the rim and the end of the extension 21 is provided with a squared portion 24 by which the member 15 may be turned. The member 15 is provided with a recess in which the cylinder lock 25 is positioned and a coiled spring 26 is inserted between the bottom of the cylinder lock and the bottom of the recess therefor. A pin 27 is secured in the member 15 and limits upward or downward movement of the cylinder lock. The cylinder lock is provided with the bolt 20 in the end fitting the aperture 28 in the member 15 and when the cylinder lock is moved downwardly this bolt 20 is moved between the ends of the links 16 and 18, the said links being provided with curved faces to allow clearance for the bolt. When this bolt is extended as shown in Figs. 5, 7 and 8 the member 15 cannot be turned to release the rim as the curved faces at the ends of the links engage the bolt 20 and prevent turning of the member 15. To hold the lock in the locked position the member 15 is provided with a recess 30 in one side and the lock is provided with a locking stud 29 adapted to be moved into the recess 30 as shown in Fig. 5. When the lock is unlocked this stud is retracted as will be understood from Fig. 6 and the spring 26 throws the lock cylinder and bolt 20 upwardly to withdraw the bolt 20 from the locking position, the upward movement being limited by the stationary pin 27 engaging in the elongated notch 31 provided in the lock body. When in the unlocked position as shown in Fig. 6, the member 15 may be turned to retract the locking members 4 at which time the rim may be removed. Upon replacement of the rim the member 15 is turned in a clockwise direction to move the members 4 back to the locking position and the lock is moved downwardly from the position shown in Fig. 6 to that shown in Fig. 5 to move the bolt 20 to the locking position and by turning the key the locking stud 29 is moved into the recess 30 to hold the lock and bolt in the locking position. The washer 22 is provided with a point 32 and turns with the member 15 and indicates whether the device is in the locked or unlocked position. When in the locked position shown in Fig. 5 a dust cap 38 may be threaded onto the member 15 to protect the lock.

From the foregoing description it becomes evident that the device is very simple and efficient in operation, will not easily get out of order, provides a means whereby the rim may be locked or unlocked on a wheel by rotation of a single member, and provides a device which accomplishes the objects described.

Having thus fully described our invention, its utility and mode of operation, what we claim and desire to secure by Letters Patent of the United States is—

1. In a device of the character described, a rotatable member, a pair of links pivotally connected to the rotatable member on opposite sides of the center of rotation, a pair of rods pivotally connected to the links and adapted to be drawn toward the rotatable member upon rotation of the member in one direction and adapted to be moved away from the rotatable member upon rotation of the member in the opposite direction, a series of lugs carried by each rod and a lock carried by the rotatable member having a bolt adapted to be moved between the ends of the links to prevent rotation of the rotatable member.

2. In a locking device, a rotatable member, a pair of links pivotally connected to the rotatable member on opposite sides of the center of rotation and having end portions terminating adjacent the center of rotation, a lock carried by the rotatable member having a bolt adapted to be extended between the said end portions to prevent pivotal movement of the links relative to the rotatable member and thereby prevent rotation of the rotatable member.

In testimony whereof we sign this specification.

EDWARD L. ACKERMAN.
ALOIS J. ZWIERZINA.